United States Patent [19]

Mombre

[11] 4,226,314
[45] Oct. 7, 1980

[54] COMBINED CLUTCH AND DOUBLE-ACTION BRAKING DEVICE

[75] Inventor: Karl W. Mombre, Wermelskirchen, Fed. Rep. of Germany

[73] Assignee: Ortlinhaus-Werke GmbH, Wermelskirchen, Fed. Rep. of Germany

[21] Appl. No.: 885,018

[22] Filed: Mar. 8, 1978

[30] Foreign Application Priority Data

Mar. 16, 1977 [DE] Fed. Rep. of Germany ....... 2711505

[51] Int. Cl.² ........................................... F16D 67/04
[52] U.S. Cl. .................................................. 192/18 A
[58] Field of Search ............... 192/18 A, 12 C, 87.16, 192/87.17, 113 A; 188/264 A, 71.6

[56] References Cited

U.S. PATENT DOCUMENTS

| | | | |
|---|---|---|---|
| 2,205,629 | 6/1940 | Peterson | 192/113 A |
| 3,688,601 | 9/1972 | Dach | 192/18 A |
| 3,809,192 | 5/1974 | Stehle | 192/113 A |
| 3,860,100 | 1/1975 | Spanke et al. | 192/18 A |
| 3,896,911 | 7/1975 | Beneke | 192/18 A |

FOREIGN PATENT DOCUMENTS 2549714 11/1975 Fed. Rep. of Germany ........ 192/18 A

Primary Examiner—Allan D. Herrmann
Attorney, Agent, or Firm—Michael J. Striker

[57] ABSTRACT

A combined clutch and double-action braking device for use in intermittently operating machines having a rotational driving shaft and a separate driven shaft, clutch or coupling disks secured to the driving shaft, and two braking disks fixedly arranged on a stationary holder, the device comprising a supporting disk secured to the driven shaft and defining a peripheral part and an intermediate part, the peripheral part projecting between the two braking disks, the intermediate part being extended to form two opposite tubular spaces divided by a fixed partition and each having an axially movable wall portion forming a pressure disk sealingly closing the assigned space; in rest condition, pressure springs resiliently urge each pressure disk against an assigned braking disk, whereas in actuated position pressure fluid is applied into the spaces to disengage the pressure disks from the braking disks and for urging one of the pressure disks against the coupling disk.

8 Claims, 2 Drawing Figures

COMBINED CLUTCH AND DOUBLE-ACTION BRAKING DEVICE

BACKGROUND OF THE INVENTION

This invention relates generally to combined coupling and braking devices, and more specifically it relates to a clutch combined with a double-action braking device for use in intermittently operating machines such as presses and the like.

For driving such machines, a primary shaft is provided with at least one coupling disk arranged for engagement with a clutch lining on a clutch supporting disk that is secured to the driven shaft of the machine. The clutch supporting disk is usually provided with two opposite, axially movable pressure disks provided with pistons that are actuated by a pressure medium to bring the friction lining into engagement with the coupling disk. In rest condition, the driven shaft is braked by means of two stationary braking disks and by pressure springs which urge the pressure disks away from the coupling disks and into engagement with the braking disks.

Intermittently operating machines such as presses and the like are equipped with the above-defined clutch and double-acting braking devices mainly for safety reasons, especially to meet the requirements and regulations imposed by labor unions, for example. In the event that one of the combined braking members, usually the spring biased pressure disk engaging the braking disk, becomes accidentally inoperative, the other braking member provided in the machine remains operative and performs the braking function.

Driving units provided with a combined clutch-and-braking devices having an additional brake have been known in the art. In one prior art device of this kind, an additional brake is simply arranged at a distance from the coupling-and-braking unit. A considerable disadvantage of this prior art embodiment results above all from the separate construction of a supporting disk of cylindrical configuration and having relatively thin walls. Since these walls are exposed to large bending forces, a considerable danger of rupture and of a permanent failure is always present. Moreover, such additional braking devices are costly in manufacture and also present increased space requirements for the entire equipment. From the functional point of view, the separately arranged additional brake does not satisfy the requirement for an increased safety against rupture. This disadvantage is common to other known devices of this type.

In another prior art device having only a single brake supporting disk that at one side is provided with a cylindrical space and at the other side with a piston, there result pressure spaces having different sizes. For this reason even this system cannot be considered as satisfactory from the safety point of view. Since the clutch and brake devices have in most cases a very limited space available, it is essential that the clutch and brake units be designed so as to occupy minimum space. The aforementioned known devices because of their excessively voluminous structure of supporting disks and pressure rings are far from meeting the requirement for a compact design.

Furthermore, the aforementioned prior art devices of this kind, due to their bulky construction of supporting disks and pressure disks arranged at least partially in a housing, have an insufficient area for radiating heat outwardly so that localization of heat takes place which inadvertently reduces the working life and functional reliability of the device (the packing and the lamination, for example).

In another known modification, two commercially available, combined clutch-and-brake units have been arranged, respectively, at each side of the driving member to provide the required additional brake. In spite of the fact that this arrangement meets the safety requirement, it has the considerable disadvantage that in most cases it has a very limited use in special applications only and moreover, to fulfill the safety measures for the entire equipment an inproportionally high cost has to be expanded.

SUMMARY OF THE INVENTION

Accordingly, it is a general object of the present invention to overcome the disadvantages of the prior art.

More particularly, it is an object of this invention to produce an improved clutch and double-action braking device which is space saving, economical in cost, and has an exceptionally high functional reliability.

In pursuance of these objects and of others which will become apparent hereafter, one feature of the invention resides in the provision of a supporting disk for the pressure disks which includes two opposite pressure cylinders having equal pressure spaces arranged on both sides of a common partition and each having an axially movable piston connected with the pressure disks.

The supporting disk for the double-acting braking device of this invention due to its uniform arrangement of pressure cylinders having equal pressure surfaces on each side of a common partition, is completely balanced for pressure and consequently free of bending tension. As a result, this part of the braking system that is frequently exposed to high and changing loads is no longer damage-prone and susceptible to failure.

In a working embodiment of this invention the partition between the pressure cylinders of the supporting disk and therefore the entire supporting disk can be made very thin and as a consequence a generally desirable, compact construction unit is achieved.

The narrow configuration of the supporting disk for the pressure disk is further enhanced by the use of guiding pins for the pressure disks, the pins being fixedly mounted in the partition and having their free ends projecting into the pressure spaces on both sides of the common partition and projecting into corresponding recesses in respective pressure disks. The supporting disk for the two cylinders is arranged between stationary braking disks and is provided on its periphery with rib-like projections fixedly connected by pressure rings provided on their outer sides with friction lining. By this arrangement of radial reinforcing ribs and annular fixed braking rings, a plurality of peripheral ventilation chambers is obtained. The lower part of the reinforcing ribs has ventilation openings interconnecting the bars with the interior of the device. In this manner, there is provided a plurality of large area ventilation chambers having radially directed blades or shovels which contribute to an almost ideal heat dissipation. The resulting combined clutch-and-braking device that in the above-described manner is relieved from the heat load shows an exceptionally long working life and operational reliability. The pressure medium or fluid for actuating the axially movable pressure rings in the pressure spaces is applied through passages provided in the partition in the supporting disk and through bore holes in the central clutch supporting member.

In the inoperative or rest position of the clutch-and-braking device of this invention, the pressure disks are held in their braking position in engagement with the stationary braking disks by means of pressure springs that extend between the outer sides of each pressure ring and a clutch supporting disk at one side or cover member secured to the driving shaft, on the other side. The springs are seated in suitable recesses and the entire construction guarantees that in the event of a broken spring the spring pieces cannot enter in any case the spaces adjacent the braking and coupling areas.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENT

Figure 1:
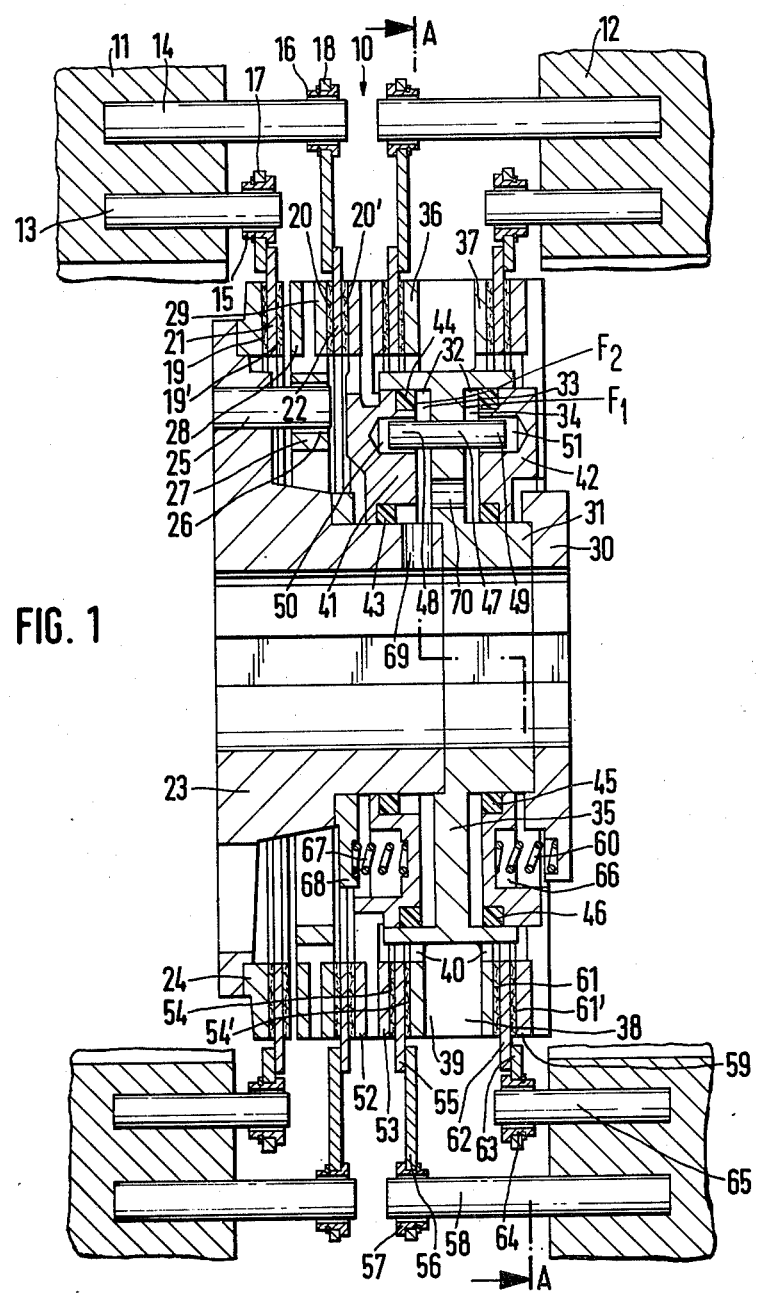
FIG. 1 is a sectional side view of the combined coupling and double-action braking device of this invention.

Referring to FIG. 1, the combined clutch-and double-action brake 10 of this invention is operatively connected at the left-hand side with a rotational driving part 11, such as a flywheel or belt pulley and on its right-hand side cooperates with a fixedly mounted holder 12. In the driving part 11, there are embedded a plurality of shorter carrier pins 13 and a plurality of longer carrier pins 14 each supporting an axially movable socket 15 and 16 which, respectively, support mounting sheet metal disks 17 and 18 to which annular coupling disks 21 and 22, provided on both sides thereof with frictional lining 19, 19' and 20, 20' are connected. In this manner, the coupling disks 21 and 22 are torsionally firmly supported with respect to the driving part 11.

A driven shaft of the machine (not shown) passes through the central opening of the clutch supporting member 23 and is fixedly coupled for rotation therewith. The clutch supporting member 23 includes a radially spaced and axially directed carrier pin 25 which engages a corresponding opening in a double action pressure disk 27 and carries the disk 27 during the rotation of the clutch support 23. The double action pressure disk 27 is provided with axially displaceable pressure rings 28 and 29 actuated by a pressure fluid and each supporting the friction lining 19' and 20 for engagement with coupling disks 21 and 22 when actuated. A second supporting disk 31 is also fixedly connected to the clutch support 23. The disk 31, according to this invention, is provided with two cylindrical parts 32 separated by a common partition 35 to define two spaces 33 and 34 having equal pressure surfaces F1. Two supporting rings 36 and 37 are integrally connected to the peripheral end portions of the double cylinder 32, each projecting upwardly from the double cylinder 32 to face frictional lining of fixedly mounted braking disks 55 and 62.

Figure 2:
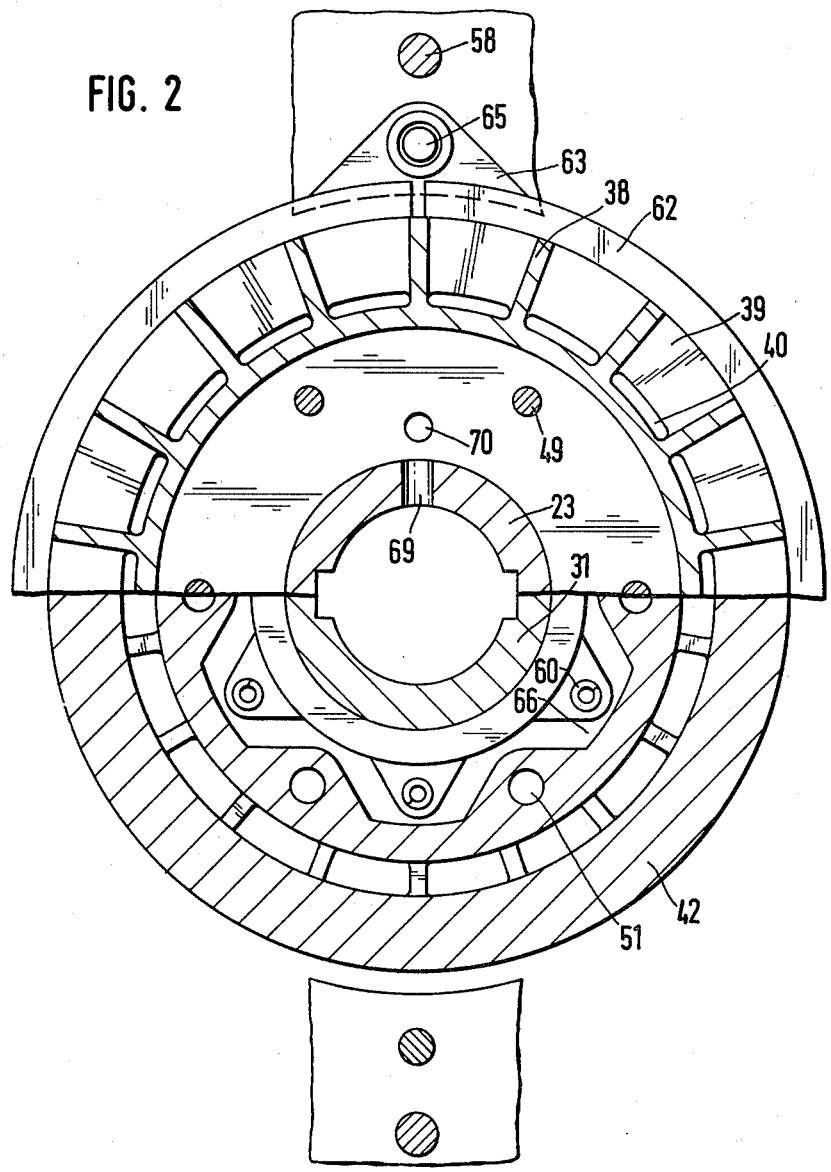
FIG. 2 is a front sectional view taken along line A—A of the combined coupling and double-action braking device of FIG. 1.

The supporting rings 36 and 37 are connected by a plurality of radially directed reinforcing ribs 38 arranged at regular intervals on the periphery of the double cylinder 32, as can be most clearly seen from FIG. 2. The reinforcing ribs 38 act during the rotation of the driven shaft as ventilation blades and together with the supporting rings 36 and 37 form a plurality of ventilation chambers 39 having openings 40 at lower portions of the supporting rings 36 and 37 between respective reinforcing of stiffening ribs 38.

The axially displaceable pressure disks 41 and 42 having pressure surfaces F2 equal to surfaces F1 of spaces 33 and 34, operate in a piston-like manner and hermetically seal by means of seals 43, 44, 45, 46 the pressure spaces 33 and 34. An axially directed carrier pin 47 passes through the partition 35 and is integrally connected therewith and projects at each end 48 and 49 thereof into corresponding recesses 50 and 51 in the pressure disks 41 and 42 to axially guide these pressure disks and to carry them for rotation together with a clutch support 23. The pressure disk 41 facing the clutch is provided with two pressure rings 52 and 53 which are fixedly mounted on the pressure disk 41 and are therefore axially displaceable therewith into a coupling position in engagement (by means of the pressure ring 52) with the frictional lining 54 of stationary braking disk 55 when pressure fluid is applied into pressure spaces 33 and 34. If fluid pressure is released, pressure disk 41 is urged by pressure spring 67 against the frictional lining 54, 54' of the stationary braking disk 55 which is fixedly connected to a mounting sheet metal 56, and via a plurality of sockets 57 arranged on a plurality of guiding pins 58 fixedly connected to the stationary, and firmly mounted holder 12.

The other pressure disk 42 is provided with a further pressure ring 59 which in the rest position of the braking device is urged by a spring 60 against the frictional lining 61, 61' of the stationary braking disk 62. Similarly, the second braking disk 62 is connected via a mounting metal sheet 63, to axially movable sockets 64 supported on guiding pins 65 projecting from the stationary holder 12. The pressure disk 42 is provided with recesses 66 in which the pressure springs 60 are fitted whereas the other end of the springs 60 is fitted in recesses provided in a cover 30. The recesses 66 in the pressure ring 42 are radially staggered with respect to the holes 51 that are provided on the other side of the pressure disk 42 to receive ends of the guiding and carrying pin 48 (FIG. 2); by this arrangement an exceptionally narrow and consequently space-saving construction of the pressure disk is made possible.

The pressure disk 41 is urged into its braking position in contact with the frictional linings 20 and 20' of the coupling disk 22 by means of the spring 67 which at one end thereof is seated in a recess provided in a coupling supporting disk 68 and at another end thereof in a recess porvided in the pressure ring 41.

Pressure fluid is applied into the pressure spaces 33 and 34 through a passage 69 provided in the clutch support 23 and through opening 70 provided in the partition 35 of the double cylinder 32.

The combined clutch-and double braking action device of this invention performs its coupling or clutch function when the pressure fluid is applied into the pressure spaces 33 and 34 and overcomes the bias of springs 60 and 67. By this action, the pressure disk urges against the coupling disks 21 and 22; if the pressure fluid is removed, the device performs its braking function and both braking disks 41 and 42 are urged by pressure springs 60 and 67 against the stationary braking disks 55 and 62. The increased heat radiating surface resulting from the arrangement of ventilation chambers 29 with stiffening ribs 38 acting as ventilation vanes makes possible a particularly efficient heat removal. The action lines of forces of the braking moment are distributed uniformly on both braking rings whereby a particularly favorable distribution of lines of action of braking forces results from their transfer via the pressure ring of the supporting disk on the one side and via the pressure ring of the pressure disk, on the other side, to the partition 35 of the supporting disk where the lines of force are reunited and can be transferred to the driven shaft without any bending moment.

While the invention has been illustrated and described as embodied in a combined coupling and double braking action device for intermittently operating machines, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention, and, therefore, such adaptations should and are intended to be comprehended within the meaning and range of excellence of the following claims.

What is claimed as new and desired to be protected by Letters Patent is set forth in the appended claims:

1. A combined clutch and double-braking action device for use in machines having a rotational driving shaft and a separate driven shaft, said device comprising at least one coupling disk secured to said driving shaft; two braking disks fixedly arranged in a spaced relation with each other on a stationary holding member; a clutch support and at least one supporting disk each secured to said driven shaft, said one supporting disk defining a peripheral part and an intermediate part, said peripheral part projecting between said braking disks, said intermediate part including two opposite pressure spaces having a common partition therebetween and each cooperating with an axially movable pressure disk for sealingly closing the assigned space; said pressure spaces and said pressure disks delimiting substantially equal surfaces; spring means for resiliently urging each pressure disk against a corresponding braking disk; and means for applying pressure fluid into said spaces to disengage said pressure disks from said braking disks and for urging at least one of said pressure disks against said coupling disk.

2. A combined clutch and double-braking action device for use in machines having a rotational driving shaft and a separate driven shaft, said device comprising at least one coupling disk secured to said driving shaft; two braking disks fixedly arranged in a spaced relation with each other on a stationary holding member; a clutch support and at least one supporting disk each secured to said driven shaft, said one supporting disk defining a peripheral part and an intermediate part, said peripheral part projecting between said braking disks, said intermediate part including two opposite pressure spaces having a common partition therebetween and each cooperating with an axially movable pressure disk for sealingly closing the assigned space; said pressure spaces and said pressure disks delimiting substantially equal surfaces; spring means for resiliently urging each pressure disk against a corresponding braking disk; and means for applying pressure fluid into said spaces to disengage said pressure disks from said braking disks and for urging at least one of said pressure disks against said coupling disk, said partition between said pressure spaces including an integrally connected pin for guiding and carrying said axially-movable pressure disk.

3. The device as defined in claim 2, wherein respective free ends of said pin are guided in corresponding recesses provided in said pressure disk.

4. The device as defined in claim 3, wherein said clutch support is provided with a passage for introducing pressure fluid into said pressure spaces and the partition of the supporting disk is provided with an additional opening for introducing the pressure fluid into both of said pressure spaces.

5. The device as defined in claim 3, further including an end cover, the clutch support being integrally connected with said supporting disk and with said cover, said spring means including springs seated in recesses provided respectively in said supporting disk and one of said pressure disks, and between the other pressure disk and said cover.

6. The device as defined in claim 1, wherein said coupling-, braking- and pressure-disks each have an annular configuration and are coaxially arranged around said driven shaft, said clutch support being connected to the driven shaft and to said supporting disk, and said supporting disk carrying said pressure disks.

7. The device as defined in claim 6, wherein said intermediate part of the supporting disk forms a double cylinder the peripheral part of which is provided with a plurality of uniformly spaced and radially directed stiffening ribs, and two supporting rings facing said braking disk and being connected to the sides of said stiffening ribs to form therewith a plurality of ventilation chambers.

8. The device as defined in claim 7, wherein portions of said supporting rings between respective stiffening ribs are provided with ventilation openings.

* * * * *